United States Patent Office 3,433,642
Patented Mar. 18, 1969

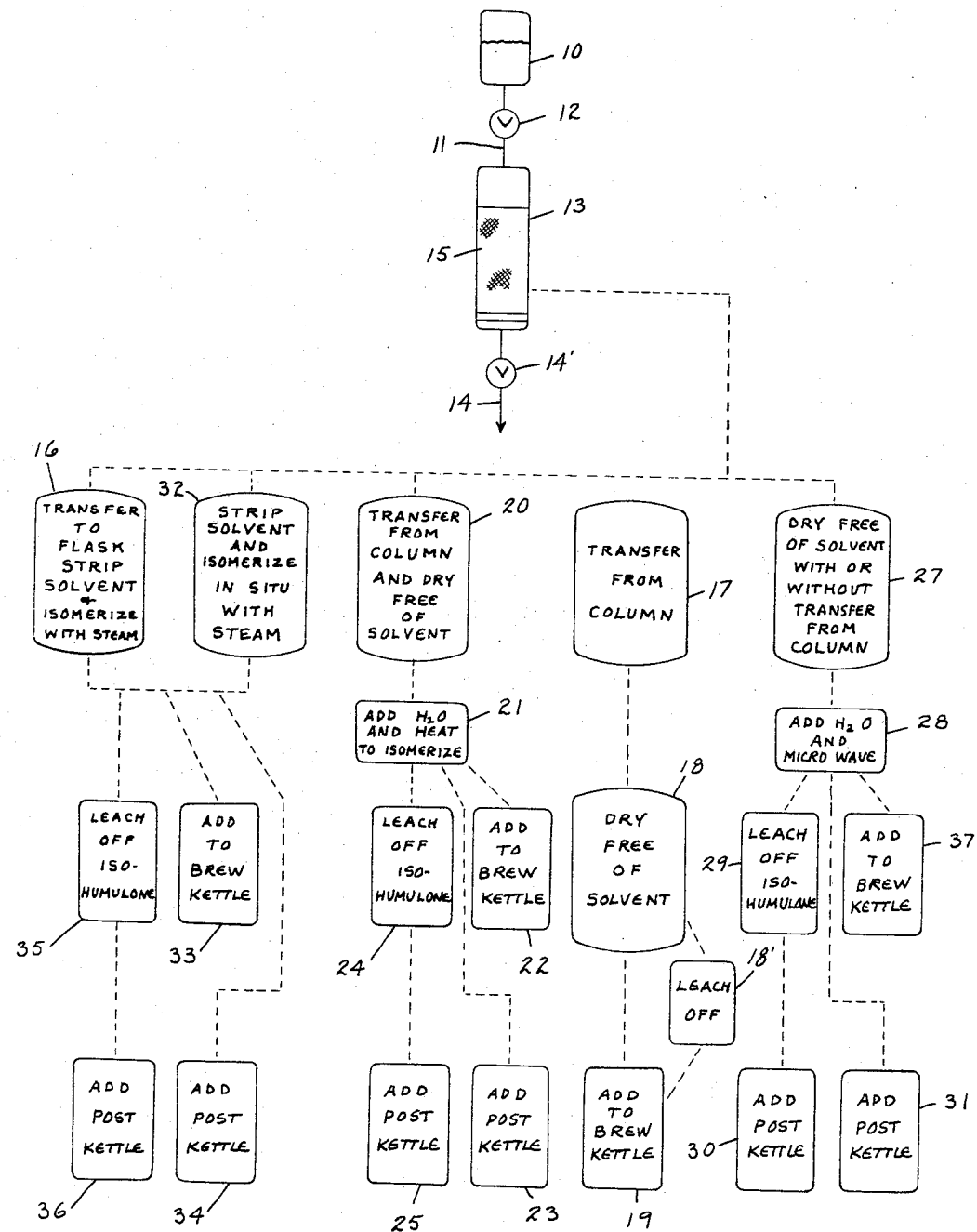

3,433,642
FRONTAL CHROMATOGRAPHIC SEPARATION AND ISOMERIZATION OF HUMULONE
Tommy Nakayama, Milwaukee, and Donald H. Westermann, Brookfield, Wis., assignors to Miller Brewing Company, Milwaukee, Wis., a corporation of Wisconsin
Filed June 1, 1966, Ser. No. 554,546
U.S. Cl. 99—50.5        12 Claims
Int. Cl. C12c 9/02; B01d 15/08

ABSTRACT OF THE DISCLOSURE

A process of separating humulone which comprises preparing a hops extract by use of a solvent, flowing the hops extract through a body of inert alkaline granular adsorbent material of a type which rejects lupulone and has a high affinity for humulone, such as, natural or synthetic calcium silicate, magnesium silicate, alumina, and a mixture of calcium oxide and diatomaceous earth to carry out a frontal chromatographic separation and cause retention of the humulone on the absorbent material while the other hops extractives passes through and thereafter removing solvent.

---

This invention relates to improvements in a method of separating and isomerizing humulone for utilization.

The contribution of bitterness and aroma which is imparted to beer by hops is well recognized in the brewing industry. Humulone, or alpha acid from hops, added to the brew kettle for its subsequent isomerization to the more soluble bitter isohumulone compounds has been the subject of extensive research during the past twenty years.

Brewers have realized that there is a 70%–80% isomerization yield from humulone in the normal brewing process and that only 20% to 35% of the humulone added to the brewing process is utilized as isohumulone in the finished product. The characteristic processing losses of humulone, its subsequent isomerization in the brew kettle, and coprecipitation and degradation have been extensively studied. Numerous attempts have been made to increase the utilization of alpha acids in the brewing process with only limited success.

A number of methods for the isolation of alpha acids (humulone) and beta acids (lupulone) have heretofore been proposed, the latter being undesirable in beer because of limited solubility. While some of the these methods have involved chromatographic separation of hop extracts, the present invention discloses an entirely different method and technique for chromatographic separation which is relatively simple and produces an almost 100% yield of isohumulone compounds from the humulones in the hops and involves a very efficient novel separation of the humulones from the whole hop extract by a "frontal" chromatographic technique as will be hereinafter explained in greater detail.

Before describing the techniques used by other researchers in the brewing industry it appears advisable to define the terminology in techniques peculiar to column chromatography.

Chromatography is the process of separating chemical constituents by virtue of adsorption characteristics on a bed of adsorbent. In adsorption chromatography a discrete sample containing the mixture to be separated is placed at one end of a section of an adsorbent column. A mobile liquid phase is used to wash the mixture through the adsorption bed and the selective forces of sorption, upon which the separation of mixture depends, separates the components in countercurrent multistage fashion throughout the bed. Continued washing produces eluates from the column containing the separated components.

In the technique of *partition* chromatography a hydrophilic liquid is added to the adsorption bed, generally prior to physically making up the bed. The discrete sample placed on the bed is then washed or developed with a lipophilic solvent. Separation of the components in the sample mixture is dependent upon the liquid-liquid distribution of the components or the so-called partition coefficient.

In the process of *reversed phase partition* chromatography the liquid phases of the partition column are physically reversed. The lipophilic solvent is added to the adsorbent and the eluting phase is hydrophilic. Again the separation is a function of liquid-liquid distribution coefficients of the components in the original sample mixture.

*Ion exchange* chromatography involves the replacement of the adsorbent with an ion exchange resin. Separation of the components in the sample is dependent upon equilibria conditions between the un-ionized components, the ionized components, the "exchange" resin, and molecular adsorption. Elution of the column is accomplished by adding a solution containing a more strongly exchanged ion or by increasing the concentration gradient in the bed with other ions.

In the aforementioned elution techniques the sample mixture is added as a discrete entity and the elution media contain no sample material.

In development of a discrete sample on an adsorption column the development or elution media added to the column is often of fixed composition. When components are too strongly adsorbed on the column it becomes necessary to change the composition of the elution media to desorb desired components using a media of variable composition, e.g., pH, solvent ratios, salt concentration, etc. This is called *gradient elution*.

Bayaert and Cornand (Congres International des Industries de Fermentation, Conferences et Communications 64:236–78, Ghent, Belgium, 1947) studied the application of chromatographic techniques for the separation of alpha and beta acids from hops with the objective of purifying alpha and beta acids for further analytical evaluation. Silica gel was used but the type of silica gel was found to be extremely critical. A clean separation of the mixture of alpha and beta acids was not obtained.

The method of Bayaert and Cornand was extended by Govaert and Verzele, M. (ibid., 64:279–96, 1947). The alpha acid was evaluated by lead precipitation and the beta acid by potentiometric titration.

Lundin, H. (Wallerstein Laboratories Communications, 10:231, 1947) proposed a method of analyzing the bitter acids of hops in an ethanol solution by adsorption chromatography of the ethanol solution. The alpha and beta acids were not separated.

The method of Govaert and Verzele was extended by Rigby and Bethune, J. L. (American Society of Brewing Chemists Proceedings, p. 1, 1950) but no separation of humulones and lupulones occurred. The purpose of the chromatographic separation was to remove the optically interfering substances from the designated wave lengths for the spectrophotometric analysis.

The method of Govaert and Verzele was extended by E. Schild and W. Riedl (Brauwissenschaft, pp. 81–87, 1952) to include the separation of alpha and beta acids and the total soft resins.

Humulones and lupulones from whole hop extracts were separated by Alderton et al. (Analytical Chemistry, 26:983, 1954) using the method of Bayaert and Cornand with the modification of using ethylene dichloride instead of benzene to develop the column. Increased stability of the acids in ethylene dichloride solvent was claimed. Humulones and lupulones were separated on an anion exchange resin from a methanol extract of hops eluting with various acidic aqueous methanol solutions.

A single solvent system, benzene, was used by Govaert and Verzele to extract hops and develop the extract on a silica gel column to isolate the alpha and beta acids which were eluted together. The "humulone complex" of Verzele and Govaert (ibid., 18:181, 1955) was separated from an iso-octane extract of hops on a silica gel column by partition chromatography using an alkaline buffered (pH 9.05) methanol solution as the stationary phase and iso-octane as the moving phase. The instability of humulone in the system was emphasized as follows: "A more alkaline pH also could accomplish this but it is to be avoided owing to increased instability of the humulone with increased alkalinity." Emphasis was placed on the need for proper preparation of the silica gel techniques previously cited.

Humulinone and cohumulinone were isomerized on a silica gel column by Cook et al. (Journal of the Institute of Brewing, 62:220, 1956). The phenomenon explained the high melting point of a product obtained by Verzele and Govaert thought to be adhumulinone but which in reality proved to be an isomer adhumulinone.

Spetsig and M. J. Steninger (Journal of the Institute of Brewing, 62:333, 1956) separated mixtures of cohumulone, humulone and adhumulone in a diatomaceous earth column using carbon tetrachloride as a stationary phase and methanol as the moving phase.

Ether extraction, in the presence of $SO_2$, of hops by the method of Gough (ibid., 62:9, 1956) was used by M. Verzele (Wallerstein Laboratories Communications, 68:7, 1957) for the purification of an extract on a charcoal column. The eluate was measured polarimetrically for alpha acids.

The separation method of Verzele was modified by Bausch et al. (Die Nahrung 3, No. 5/6: 501–514, 1959) using ethyl acetate to elute a charcoal column containing a sulfur dioxide saturated ether extract.

Spetsig et al. (European Brewery Convention Proceeding of the 6th Congress, Copenhagen, 1957, p. 22) modified his original partition technique for the separation of hop bitter substances to include chloroform with gradient elution (pH 3–11) with aqueous buffered methanol.

Howard, G. A., and Slater, C. A. (Journal of the Institute of Brewing, 66:305, 1960) used a basic ion exchange resin for separation of alpha acids from methanolic extract of hops. The separated humulones were subsequently isomerized and added to unhopped beer.

Spetsig, L. O. (European Brewery Convention Proceedings of the 6th Congress, Copenhagen, 1961, p. 134) modified his original partition procedure by changing the geometry of the column and preparing the diatomaceous earth by drying in a desiccator containing dichloroldimethylsilane. The prepared powder was suspended in the eluting media and saturated with respect to chloroform. Hops were extracted with chloroform and the extract placed on the column with a small amount of the first eluting medium. Further elution to separate alpha and beta acids were carried out with 25% methanol of increasing pH gradient.

Hop components were separated by Hartl and Kleber, W. (ibid., 1961, p. 139) on a polyamide column using water, methanol and phosphate buffers.

Columns of Dowex 1-X4 anion exchange resin (acetate form) were used to separate isohumulone, isocohumulone, lupulon, colupulon, humulone and cohumulone from partially isomerized ethanolic extracts of hops by Simmons, D. H. and Wilson, Pan, L., (Journal of the Institute of Brewing, 68:495, 1962).

The n-hexane soluble components of beer, beta acids, alpha acids, the oxidation products of alpha and beta acids, and total soft resins of old hops were subjected to column chromatography by Kuroiwa and Hashimoto, H. (Report of the Research Laboratories of Kirin Brewery Co., Ltd., No. 6:12–26, 1963). The silica gel column was prepared in a 15 to 1 n-hexane-ethylacetate mixture. Elution with ratios of these solvents of 15 to 1, 3 to 1 and 1 to 1 was carried out in progressive gradients. Samples were placed on the column with an appropriate solvent ratio in which the sample was soluble.

Beta soft resins were separated by a chromatostrip method by Sasahara, T. (Report of the Research Laboratories of Kirin Brewery Co., Ltd., No. 7:35–41, 1964) removed and boiled in aqueous and aqueous alkaline solutions. These products were chromatographed on a silica gel column, eluting with normal hexane ethylacetate systems in the ratios of 15 to 1, 3 to 1 and 1 to 1, dependent upon sample solubility. Column development required 8 to 9 hours.

It is a general object of the present invention to provide for the separation of hop components a chromatographic method involving a frontal technique wherein the process is distinguished from the closest procedures of the prior art by the fact that the material fed to the chromatographic column is the whole extract material itself so that everything fed to the column contains the materials which are to be separated, and in which the separated materials are retained on the adsorbent for subsequent use.

A further object of the invention is to provide an improved method of separating humulone complex from whole hop extract wherein adsorbent material in the column is a granular alkaline material such as natural or synthetic calcium silicate. These adsorbent materials are inexpensive, inert, and acceptable for inclusion in food products. The adsorbents also have a high adsorptive capacity for humulone and permit high flow rates.

A further object of the invention is to provide an improved method of separating humulone from whole hop extract as above described which includes the use of a frontal chromatographic technique together with the application of energy such as that applied by the latent heat of vaporization of steam or by microwaves to accomplish the isomerization. Where steam is employed the process provides for the isomerization of the humulone on the adsorbent material simultaneously with the desolventizing of the bed with steam. The initial latent heat of vaporization of the steam is used to strip the solvent from the bed, and the condensed steam provides the water which is required for the isomerization of humulone. With this process considerable energy is saved, as it is not necessary to remove large quantities of solvent from a dilute extract solution as is required in a number of the prior art processes.

A further object of the invention is to provide a method as above described which gives a high yield of isohumulones from the humulones and which yields a by-product stream containing the lupulone waxes, and other extraneous materials.

A further object of the invention is to provide a method as described in which the alpha acid is retained on the adsorbent for subsequent use either as humulone or isohumulone; in which the adsorbent materials show an exceedingly high retention of humulone and a low retention of lupulone; and in which the adsorptive capacity of the column material for the alpha acids has been shown to be three times that obtained in the prior art by the use of anion exchange resins, which resins are very expensive compared to the material used in the present invention; in which the flow rates through the column are much higher than that of chromatographic procedures heretofore used on hop components; in which the lupulone and extraneous material are eluted from the column with ease as compared with the use of gradient elutions as in the prior art; in which the stability of the humulone or isohumulone on the adsorbent is excellent, making it possible to prepare material for subsequent commercial use without degradation in storage; in which the adsorbent material is inert, making it compatible with the brewing process for simple addition during processing.

A further object of the invention is to provide a novel process in which the humulone complex, either with or without prior isomerization, may be conveniently utilized while on the adsorbent material, as for example, by adding the adsorbent material containing the humulone complex to the hot wort in a brewing process, either "post kettle" or at an earlier stage, and in which the isomerization may, if desired, be accomplished in the hot wort.

With the above and other objects in view the invention consists of the improved method of separating and isomerizing humulone for utilization, and all of its steps and combinations, as set forth in the claims, and all equivalents thereof.

In the accompanying drawing, the figure is a diagrammatic view illustrating the chromatographic procedure and showing a number of different techniques for handling and/or isomerizing the separated humulone.

Section I.—Chromatographic separation

A novel feature of the improved method is the separation of the humulone complex and lupulone complex of the hops from each other by the frontal elution chromatographic separation technique for the purpose of obtaining humulone complex in as pure a form as possible, the lupulone together with waxes and other extraneous materials being removed with the effluent, and the humulone complex being retained for further use on an inert alkaline granular adsorbent material of a specially determined type which has no effect on food products such as beer.

Referring to the drawing, the feed material preferably consists of a hexane extract of hops at approximately a 4% dissolved solids concentration which has been filtered to remove extraneous insoluble solids. While the use of hexane is preferred, other hydrocarbon solvents may be used. Also, hexane plus a small percentage of methanol or hexane plus a small percentage of acetone may be employed. In addition, other aliphatic hydrocarbons such as pentane, hexane, heptane, octane, or iso-octane may be used. Also, chlorinated hydrocarbons such as chloroform, carbon tetrachloride, dichloromethane, dichloroethane, trichloroethane, and tetrachloroethane can be employed. An aromatic type of solvent such as toluene, benzene, or xylene may also be used, providing care is exercised to remove these solvents from the final product.

The extract may be fed from a suitable reservoir 10 through a line 11 controlled by a valve 12 into the chromatographic column 13. The chromatographic column used in the procedures had a 20 mm. inside diameter and the reservoir 10 had a 250 mm. capacity. The chromatographic column 13 which was used was a No. 2–K–42225 produced by the Kontes Glass Company of Vineland, N.J.

The column 13, before being used, was filled with hexane. Thereafter the adsorbent material in the amounts specified in the examples which follow, preferably up to approximately 20 grams, was slowly added to the column allowing the adsorbent to settle. The adsorbent material must be an inert alkaline granular material which tends to reject lupulone and which has a high affinity for humulone and has no effect on beer. The preferred material is natural or synthetic calcium silicate, but basic alumina also produces good results. The hexane was drained from the column through the effluent line 14 under control of a valve 14', at a flow rate of approximately 5 mls. per minute under a 4 to 5 p.s.i.g. $CO_2$ pressure until the solvent level reached the top of the bed of adsorbent material. With the column thus prepared, the valve 12 was opened to admit the hexane extract of hops to the column 13, with the material being added and eluted at a rate of 5 mls. per minute unless otherwise indicated in the examples which follow. The effluent from the line 14 was collected in a one-liter flask and the elution of the column was continued until the adsorbent was charged to capacity with humulone complex. This capacity was reached when the front of the humulone complex reached the point of elution. The presence of the humulone complex can be determined by spectral analysis. The flow rate through the column 13 must be adjusted with respect to the particular concentration of the hops extract and with respect to the geometry of the column so that there is removal of a maximum amount of humulone from the hops extract before it leaves the column. It is of course desirable to remove substantially all of the humulone. Quantitative results of the frontal technique on various adsorbent materials are shown in the following examples using a hexane extract of hops at a 4% dissolved solids concentration:

Example I 18.77 g. of synthetic calcium silicate (Johns-Manville's "Micro Cel C") having an analysis of 27.8% CaO and 49.5% $SiO_2$ was used for the adsorbent 15 in the column. The dimension of the bed was between approximately 10" in height with a diameter of ⅞", the adsorbent having a pH of 9.8 (10% solids in water). The feed material in the reservoir was 800 mls. of the hop extract under a $CO_2$ head pressure such as to provide for a flow rate of 4.5 ml. per minute. The feed material contained 5172 mg. humulone and 3320 mg. lupulone. The effluent from the line 14 showed an analysis of 3285 mg. lupulone and 853 mg. humulone, indicating that practically all of the lupulone passed through the column. There was retained on the column 4319 mg. humulone or approximately 83.3% of the humulone, and only 45 mg. lupulone or 1.3%. There was 294 mg./g. humulone on the adsorbent.

Example II 66.1 g. of basic alumina was used for the adsorbent 15 in the column. The adsorbent had a pH of 10 (10% solids in water). The feed material in the reservoir was 500 mls. of hop extract under a suitable $CO_2$ head pressure. The feed material contained 2333 mg. humulone and 900 mg. lupulone. The effluent from the line 14 of the drawing showed an analysis of 805 mg. lupulone and 88 mg. humulone, indicating that practically all of the lupulone passed through the column. There was retained in the column 2245 mg. humulone or approximately 96.2% of the humulone, and only 95 mg. or 4.1% of the lupulone. There was also 24.1 mg./g. humulone on the adsorbent.

Example III 18.0 g. of synthetic calcium silicate (Johns-Manville's "Micro Cel C") having an analysis of 27.8% CaO and 49.5% $SiO_2$ was used for the adsorbent 15 in the column (referring to the drawing). The dimension of the bed was 9½" x ⅞", the adsorbent having a pH of 9.8 (10% solids in water). The feed material in the reservoir was 900 mls. of hop extract under a $CO_2$ head pressure of 4 p.s.i.g. to provide a flow rate of 5 ml. per minute. The feed material contained 5458 mg. humulone and 3595 mg. lupulone. The effluent from the line 14 showed an analysis of 3278 mg. lupulone and 900 mg. humulone, indicating that most of the lupulone passed through the column. There was retained in the column 4558 mg. or 83.5% humulone and only 317 mg. or 8.8% lupulone. There was 253 mg./g. humulone on the adsorbent.

Example IV 18.0 g. of synthetic calcium silicate (Johns-Manville's "Micro Cel C") having an analysis of 27.8% CaO and 49.5% $SiO_2$ was used for the adsorbent 15 in the column (referring to the drawing). The dimension of the bed was 9¾" x ⅞", the adsorbent having a pH of 9.8 (10% solids in water). The feed material in the reservoir was 900 mls. of hops extracts under a $CO_2$ head pressure of 2 p.s.i.g. to provide a flow rate of 2½ ml. per minute. The feed material contained 5598 mg. humulone and 3244 mg. lupulone. The effluent from the line 14 showed an analysis of 2803 mg. lupulone and 1030 mg. humulone. There was retained in the column 4568 mg. or 82% humulone and only 441 mg. or 13% lupulone. There was 254 mg./g. humulone on the adsorbent.

Example V 20 g. of synthetic calcium silicate (Johns-Manville's "Micro Cel C") having an analysis of 27.8% CaO and 49.5% $SiO_2$ was used for the adsorbent 15 in the column. The dimension of the bed was 10½" x ⅞", the adsorbent having a pH of 9.8 (10% solids in water). The feed material in the reservoir was 900 mls. of hop extract under a $CO_2$ head pressure of 8 p.s.i.g. to provide a flow rate of 10 ml. per minute. The feed material contained 7350 mg. of humulone and 4302 mg. of lupulone. The effluent from the line 14 showed an analysis of 2818 mg. humulone and 4122 mg. of lupulone. There was retained in the column 4532 mg. or 61.8% humulone and only 180 mg. or 4.1% lupulone. There was 227 mg./g. humulone on the adsorbent.

Example VI 9 g. of calcium silicate (Fisher Chemical Co.) having an analysis of 47.3% CaO and 51.7% $SiO_2$ was used for the adsorbent 15 in the column. The dimension of the bed was 3½" x ⅞", the adsorbent having a pH of 9.7 (10% solids in water). The feed material in the reservoir was 150 mls. hop extract under a $CO_2$ head pressure of 3 p.s.i.g. to provide a flow rate of 5 ml. per minute. The feed material contained 1875 mg. of humulone and 593 mg. lupulone. The effluent from the line 14 showed an analysis of 82 mg. humulone and 543 mg. of lupulone, indicating that most of the lupulone passed through the column. There was retained in the column 1793 mg. or 96% humulone and only 50 mg. or 8% lupulone. There was 199 mg./g. humulone on the adsorbent.

Example VII 20 g. of synthetic calcium silicate (Johns-Manville's "Micro Cel B") having an analysis of 22.6% CaO and 52.9% $SiO_2$ was used for the adsorbent 15 in the column. The dimension of the bed was 6¼" x ⅞", the adsorbent having a pH of 9.1 (10% solids in water). The feed material in the reservoir was 600 mls. of hop extract under a $CO_2$ head pressure of 3 p.s.i.g. to provide a flow rate of 5 ml. per minute. The feed material contained 4914 mg. of humulone and 2604 mg. of lupulone. The effluent from the line 14 showed an analysis of 492 mg. humulone and 2498 mg. of lupulone, indicating that most of the lupulone passed through the column. There was retained in the column 4492 mg. or 90.0% humulone and only 106 mg. or 4.0% lupulone. There was 221 mg./g. humulone on the adsorbent.

Example VIII 20 g. of synthetic calcium silicate (Johns-Manville's "Micro Cel T-49") having an analysis of approximately 45% CaO was used for the adsorbent 15 in the column. The dimension of the bed was 8" x ⅞", the adsorbent having a pH of 11.3 (10% solids in water). The feed material in the reservoir was 500 mls. of hop extract under a $CO_2$ head pressure of 5 p.s.i.g. to provide a flow rate of 5 ml. per minute. The feed material contained 4533 mg. of humulone and 1685 mg. of lupulone. The effluent from the line 14 showed an analysis of 419 mg. humulone and 1540 mg. lupulone, indicating that most of the lupulone passed through the column. There was retained in the column 4114 mg. or 90.8% humulone and only 145 mg. or 8.6% lupulone. There was 206 mg./g. humulone on the adsorbent.

Example IX 20 g. of calcium silicate (Fisher Chemical Co.) having an analysis of 47.3% CaO and 51.7% $SiO_2$ was used for the adsorbent 15 in the column. The dimension of the bed was 8½" x ⅞", the adsorbent having a pH of 9.7 (10% solids in water). The feed material in the reservoir was 600 mls. of hop extract under a $CO_2$ head pressure of 7 p.s.i.g. to provide a flow rate of 5 ml. per minute. The feed material contained 5322 mg. of humulone and 2832 mg. lupulone. The effluent from the line 14 showed an analysis of 150 mg. humulone and 2728 mg. lupulone, indicating that most of the lupulone had passed through the column. There was retained on the column 5172 mg. or 97.1% of the humulone and only 104 mg. or 3.6% lupulone. There was also 259 mg./g. humulone on the adsorbent.

Example X 20 g. purified calcium silicate (Fisher Chemical Co.) having an analysis of 47.3% CaO and 51.7% $SiO_2$ was used for the adsorbent 15 in the column. The dimension of the bed was 8½"x⅞", the adsorbent having a pH of 9.7 (10% solids in water). Feed material in the reservoir was 500 ml. of hexane extract of whole dried hops under a $CO_2$ head pressure of 4 p.s.i.g. The feed material contained 3785 mg. humulone and 925 mg. lupulone. The effluent from the line 14 showed an analysis of 169 mg. humulone and 1058 mg. lupulone. There was retained on the column 3616 mg. humulone and substantially all of the lupulone passed through.

Example XI

Humulones were separated from lupulones by a frontal elution chromatographic technique in a dichloromethane extract of hops on a synthetic magnesium silicate column

Example XII

To show that the alkaline granular adsorbent material of the column may be diluted with diatomaceous earth, humulones were separated from lupulones in a hexane extract of hops by using the frontal elution technique as previously described on a column consisting of 50% calcium oxide and 50% diatomaceous earth.

Example XIII

A hydrogenated hexane extract of hops was prepared in accordance with the procedure of Patent No. 3,079,262. Synthetic calcium silicate Johns-Manville "Micro Cell C") was used for the adsorbent 15 in the column. The adsorbent material with the retained tetrahydrohumulone was removed from the column and externally isomerized in an aqueous sodium carbonate solution. The resulting product may be either removed from the adsorbent or retained thereon and used in any of the ways previously described. The product had a bitter taste in water.

Example XIV

Separations were made, by procedures such as previously described, on a synthetic calcium silicate column using hexane plus 1% methanol and hexane plus 5% acetone as the solvent systems. Good separations of the humulones from the lupulones were obtained.

Section II.—Isomerization and Utilization

The humulone complex retained on the column after the procedure of Section I has been completed may be utilized in various ways. It is first desirable to remove the solvent from the humulone complex on the adsorbent material by suitable means such as drying or stripping. This stripping or drying may be done either in the column or the adsorbent material may be transferred from the column to a flask or other container. In order to prepare the humulone complex for further use the latter can be isomerized to produce the isohumulone complex. This may be accomplished by steam simultaneously with the stripping of the solvent from the adsorbent material, and such steam stripping may be done either in the column or in a separate flask. The isomerization may also be accomplished by heating the humulone complex in the presence of water on the adsorbent material in an oven. The isomerization may also be accomplished by subjecting the humulone complex on the adsorbent material to the action of microwaves in the presence of water. The isohumulone complex may be added to the brew kettle, or at any subsequent post kettle stage in the brewing process. In any case, the particular adsorbent material has no detrimental effect on the beer and will be filtered out at a final stage in the brewing process. The procedure also permits leaching the isomerized adsorbed material off the adsorbent by the use of aqueous alkali or ethanol. The resulting solution may be added to a brewing process wherever desired.

The novel method also makes it entirely practical to add the humulone complex on the adsorbent material directly to a place of use where it can be simultaneously isomerized. Several examples showing isomerization and utilization of the humulone complex material are given in the examples which follow, and are shown in the attached drawing.

Example I

The adsorbent material 15 with the humulone thereon from column 13 (referring to the drawing) of Example X, Section I, was emptied into a one-liter round-bottom flask 16 as shown in the drawing. Several stainless steel strips were added to the flask to promote mixing. Steam was then injected into the flask 16 while the latter was rotated at ambient conditions. Aliquot portions were withdrawn at five-minute intervals for spectrophotometric analysis. Isomerization of the humulone was complete as indicated by a ten-minute sample. Analysis of the powder solids at the end of fifteen minutes of the steam stripping showed 3540 mg. isohumulone compounds, 1998 mg. other solids, and 20 gm. dry powder.

Example II 0.65 gm. of the column material 15 from Example X, Section I, was transferred from the column as indicated at 17 in the drawing. It was then dried free of solvent as at 18. The material containing 124 mg. of humulone per gram of adsorbent material was added to a one-liter flask of 11.6° balling wort. The addition was the equivalent of adding 80.6 p.p.m. of humulone to the wort. The wort was boiled for ninety minutes and found to contain 47.3 p.p.m. of isohumulone at the end of the boil. Thus 58.7% of the added humulone was found as isohumulone in the boiled wort. This showed that the dried column material has definite utility when added to the brew kettle as at 19 in the drawing. As an alternative the humulones may be leached off as at 18' and added to the brew kettle as at 19.

Example III 10 g. of the adsorbent material 15 of Example X, Section I, was vacuum dried free of solvent as indicated at 20 in the drawing. This was then slurried with approximately 25 ml. of water and oven heated at 95° C. for approximately thirty minutes to isomerize the humulone, as indicated at 21 in the drawing. The resulting slurry was again vacuum dried and used in the following examples:

(A) 0.4374 g. of column material containing 114 mg. of isohumulone per gram of solids was added to one liter of 11.6° balling wort at the beginning of a ninety-minute kettle boil, as indicated at 22 in the drawing. In this example, 49.9 p.p.m. of isohumulone was added and the wort actually contained 34.4 p.p.m. of isohumulone at "knockout." This showed a 68.9% utilization of isohumulone which compares with the 20%–35% utilization when hops is added to the brew kettle in conventional procedures.

(B) A similar quantity of adsorbent material containing the same amount of isohumulone per gram was added to one-liter quantities of wort fifteen minutes before "knockout," as indicated at 22 in the drawing. Here there was 49.9 p.p.m. of isohumulone added and there was 34.0 p.p.m. present at "knockout," indicating 68.1% utilization. These examples, therefore, show the excellent utility in brewing of the isohumulones prepared by the improved chromatographic technique.

Example IV

A chromatographic column separation on synthetic calcium silicate (Johns-Manville's "Micro Cel C") in which the column material 15 contained 150 mg. isohumulone per gram of solids was used to prepare isohumulone solutions. Approximately 0.7 gm. of the column material containing isohumulone was leached with 25 ml. of 0.02 normal sodium hydroxide or ethanol as indicated at 24 in the drawing. The solutions were then filtered free of the adsorbent material. Appropriate aliquot portions for the indicated concentrations of isohumulone in the table below were added to unhopped finished beer as at 25 in the drawing:

| Sample | Solvent system | P.p.m. isohumulone added | P.p.m. in product | Percent utilization |
|---|---|---|---|---|
| Micro-Cel-C | Leached with 0.02 N NaOH. | 18.7 | 15.6 | 83.4 |
| Do | do | 37.4 | 32.8 | 87.7 |
| Do | Leached with ethanol. | 19.9 | 19.2 | 96.5 |
| Do | do | 40.1 | 38.9 | 97 |

The beers were tasted and judged to have the characteristic bitterness attributable to isohumulone.

Example V

A synthetic calcium silicate adsorbent 15 containing 95.3 mg. of isocompounds per gram of solids was transferred from the column as at 20, dried free of solvent as at 20, isomerized as at 21, and added in various amounts to decarbonated, finished, unhopped beer as at 23. The beer was agitated for twenty minutes, allowed to sand for thirty minutes, and filtered to remove the leached powder. The results were as follows:

| Mg. iso powder | Mg. iso added | P.p.m. iso theoretical | P.p.m. iso found | Persent corrected for 0 sample |
|---|---|---|---|---|
| 0 | 0 | 0 | 3.0 | |
| 10.4 | 0.099 | 9.9 | 7.3 | 43.4 |
| 20.00 | 0.191 | 19.1 | 11.3 | 43.4 |
| 30.0 | 0.286 | 28.6 | 15.3 | 43.0 |
| 60.7 | 0.578 | 57.8 | 26.0 | 29.8 |
| 100.9 | 0.957 | 95.7 | 37.2 | 35.7 |

Example VI

Synthetic calcium silicate containing humulone prepared as described in Example X, Section I. was removed from the column 13 following elution development and was dried at ambient temperature at 1–2″ Hg ABS for one and one-half hours as at 27 in the drawing. The analysis of the developed adsorbent showed .8% volatiles, 10% humulone and 6.9% isocompounds. Additional water was added to raise the moisture content to 33%. Aliquots of the material were packed into 1″ diameter test tubes. The tubes were placed in the oven of a Tappan electric range, Model R4L, #A206, 8.8 kw., at 2450 megacycles for varying lengths of time for microwave treatment as indicated at 28 in the drawing. The cooled samples were assayed for humulone and isohumulone by weighing out a 100–200 mg. portion, slurring it with 5 ml. of methanol, taking a 0.10 ml. sample of the clear supernatent and diluting it to 10 ml. with alkaline methanol, reading the adsorption at 255 and 360 m$\mu$, and calculated according to the method of Rigby and Bars (Proc.

A.S.B.C., 1961, pp. 46–50). The results are tabulated below:

| Sample No. | Heating time (min.) | Temp., °F. | Percent moisture | Calculated on an original as received basis of 0.8% moisture | |
|---|---|---|---|---|---|
| | | | | Percent humulone | Percent iso compounds |
| 0 | | | 0.8 | 10.0 | 6.9 |
| 1 | 0 | 150 | 33.3 | 4.8 | 10.0 |
| 2 | 1 | 175 | 34.3 | 2.3 | 11.1 |
| 3 | 2 | 182 | 31.3 | 1.8 | 11.2 |
| 4 | 3 | 185 | 26.4 | 1.8 | 12.0 |
| 5 | 4 | 190 | 15.8 | 1.6 | 10.8 |
| 6 | 5 | 177 | 0.5 | 3.1 | 9.5 |

Thereafter it is possible to leach off the isohumulone as at 29 and add it post kettle to the brewing process as at 30, or it can be added directly to the brewery process as at 31 or 37.

Example VII

Instead of transferring the column material 15 to a flask, such as the flask 16 of the drawing, the solvent may be stripped from the adsorbent in situ by the use of steam while the adsorbent is still in the column, the steam simultaneously isomerizing as indicated at 32. Thereafter the column material may be added directly to the brew kettle as at 33 or added post kettle as at 34, or the isohumulone may be leached off as at 35 and added post kettle as at 36.

Example VIII

In this example the isomerization of the humulones was carried out in the hop extract prior to use of the extract, and the isohumulones were retained on the adsorbent material instead of humulones as in the examples of Section I. To carry out this procedure a hexane extract of hops was reduced with sodium borohydride in accordance with the process disclosed in U.S. Patent No. 3,044,879 to cause isomerization of the humulones in the extract. The extract was thereafter caused to flow through the adsorbent body and the isohumulones were separated from the lupulones by the frontal elution technique using synthetic calcium silicate as the adsorbent material. With this procedure the isohumulones are retained on the adsorbent body ready for utilization.

While gravity columns are commonly employed in carrying out chromatographic techniques and are shown in the drawing, for purposes of illustration, it is to be understood that in carrying out the procedure of the present invention the elution medium may be caused to travel through a section of adsorbent material, disposed in any desired plane, by any suitable means.

Various changes and modifications may be made without departing from the spirit of the invention and all of such changes are contemplated as may come within the scope of the claims.

What we claim is:

1. A method of separating and preparing humulone complex for utilization comprising preparing a hops extract by the use of a hydrocarbon solvent to form an elution medium containing the material to be separated, charging a body of inert alkaline granular adsorbent material of a type which tends to reject lupulone and has a high affinity for humulone and which is selected from the group consisting of calcium silicate, synthetic calcium silicate, synthetic magnesium silicate, basic alumina, and a mixture of calcium oxide and diatomaceous earth continuously causing the hops extract to flow through the adsorbent body at such a rate with respect to the geometry of the body and the concentration of the extract as to carry out a frontal chromatographic separation and cause retention on the adsorbent material of a maximum amount of the humulone before the extract leaves the adsorbent body and while progressively developing the humulone complex on the adsorbent material as the hops extract is also serving as an elution medium, continuing said flow until the body is charged to capacity with humulone, discharging the effluent together with lupulone waxes, and other extraneous material while the hops extract is flowing through the body, and thereafter removing solvent.

2. A method according to claim 1 in which the adsorbent material is selected from a group consisting of calcium silicate and synthetic calcium silicate.

3. A method according to claim 1 in which the humulone complex is isomerized by the application of moisture and energy while the humulone complex is on the adsorbent material.

4. A method according to claim 1 in which the humulone complex is isomerized while on the adsorbent material by the application of heat and moisture.

5. A method according to claim 1 in which water is added to the humulone complex and in which the humulone complex is then isomerized by microwaves while on the adsorbent material.

6. A method according to claim 1 in which steam is employed to strip the solvent from the adsorbent material and to simultaneously isomerize the humulone complex.

7. A method according to claim 6 in which the steam stripping and isomerization is performed in the adsorbent body.

8. A method of separating and utilizing humulone complex according to claim 1 in which the humulone is isomerized by adding the adsorbent material with the retained humulone complex thereon to hot wort in a brewery.

9. A method of separating and utilizing humulone complex according to claim 3 in which the adsorbent material with the isohumulone complex thereon is added to hot wort in a brewery.

10. A method of separating and utilizing humulone complex according to claim 3 in which the adsorbent material with the isohumulone complex thereon is added post kettle in a brewery.

11. A method according to claim 1 in which the humulone is isomerized in the hops extract by reduction of the extract with sodium borohydride before the extract is caused to flow through the adsorbent body, and in which the isohumulone is the material which is retained on the adsorbent material when the hops extract is caused to flow therethrough.

12. A method according to claim 1 in which the hydrocarbon solvent is selected from a group consisting of hexane, hexane plus a small quantity of methanol, hexane plus a small quantity of acetone, pentane, heptane, octane, iso-octane, chloroform, carbon tetrachloride, dichloromethane, dichloroethane, trichloroethane, tetrachloroethane, toluene, benzene, and xylene.

References Cited

UNITED STATES PATENTS 3,364,268   1/1968   Klingel _____ 99—50.5

LIONEL M. SHAPIRO, *Primary Examiner.*

NORMAN ROSKIN, *Assistant Examiner.*

U.S. Cl. X.R.

210—31